(12) United States Patent  
Bhatasana

(10) Patent No.: US 9,383,032 B1  
(45) Date of Patent: Jul. 5, 2016

(54) INTEGRITY MONITORING OF 4-WAY DIVERTER VALVE

(71) Applicant: Saudi Arabian Oil Company, Dhahran (SA)

(72) Inventor: Chandulal N. Bhatasana, Abqaiq (SA)

(73) Assignee: Saudi Arabian Oil Company (SA)

( * ) Notice: Subject to any disclaimer, the term of this patent is extended or adjusted under 35 U.S.C. 154(b) by 0 days.

(21) Appl. No.: 14/679,511

(22) Filed: Apr. 6, 2015

(51) Int. Cl.
*F16K 11/08* (2006.01)
*F16K 37/00* (2006.01)
*G01M 3/00* (2006.01)
*G01M 3/28* (2006.01)

(52) U.S. Cl.
CPC ........... *F16K 37/0091* (2013.01); *G01M 3/002* (2013.01); *G01M 3/2876* (2013.01)

(58) Field of Classification Search
USPC .............................. 137/15.11, 625.43; 73/1.18
See application file for complete search history.

(56) References Cited

U.S. PATENT DOCUMENTS

| | | | | |
|---|---|---|---|---|
| 3,658,093 A * | 4/1972 | Kirkwood | ........... | F16K 11/0853 137/312 |
| 3,682,198 A * | 8/1972 | Davis | ...................... | F16K 11/06 137/625.25 |
| 3,964,517 A * | 6/1976 | Dickenson | .......... | F16K 11/0743 137/312 |
| 5,259,233 A * | 11/1993 | Brandt | ............... | G01N 33/0026 137/597 |
| 6,684,651 B1 * | 2/2004 | Yoshizawa | .......... | F16K 11/0655 137/625.43 |
| 7,940,189 B2 * | 5/2011 | Brown | ................ | F16K 37/0075 340/605 |

* cited by examiner

*Primary Examiner* — John Fox
(74) *Attorney, Agent, or Firm* — Bracewell LLP; Constance Gall Rhebergen; Linda L. Morgan

(57) ABSTRACT

A method for determining the seal integrity of a four way valve includes tracking a fluid line pressure in a fluid line that is in fluid communication with the inlet of the four way valve, with a line pressure transmitter. A body cavity pressure in a body cavity of the four way valve can be tracked with a body cavity pressure transmitter. The body cavity is a space within the valve body outside of the valve plug. The four way valve can be insulated with a thermal insulation that reduces the effect of an ambient temperature on the body cavity pressure. A valve body temperature can be monitored with a valve body temperature transmitter.

17 Claims, 5 Drawing Sheets

INTEGRITY MONITORING OF 4-WAY DIVERTER VALVE

BACKGROUND OF THE INVENTION

1. Field of the Invention

The present invention relates in general to diverter valves, and more particularly to four way valves associated with bidirectional provers.

2. Description of the Related Art

In typical pipeline systems that transport various liquid hydrocarbon, for example at marine terminals where liquid hydrocarbon is loaded onto vessels as cargo, it is important to measure the flow of hydrocarbons accurately as ownership of the hydrocarbon commodity changes and a dollar value is assigned to the volume of hydrocarbon. The accuracy of the flow meter used to measure the volume of the hydrocarbon, such as turbine meter, positive displacement meter, liquid ultrasonic meter, or other known metering device, can be affected by a variation in characteristic of fluid to be measured, changes in operating process conditions, life cycle of flow meter, and other external conditions. A meter prover can be used to check the accuracy of the flow meter by deriving a meter factor. When the meter proving system is being operated, the entire flow of fluids from the custody transfer flow meter is diverted through the prover.

Meter proving systems in the U.S. and internationally, in general, can be guided by The American Petroleum Institute Manual of Petroleum Measurement Standards, Chapter 4-Proving Systems, Section 2, Displacement Provers, Third Edition, September 2003, Reaffirmed—March 2011 (hereafter this standard shall be referred as API MPMS Chap 4.2). Meter proving using a bidirectional sphere prover is approved as per this API Standard.

A typical bidirectional sphere prover can have a length of pipe through which the sphere travels back and forth, actuating a detector at each end of the calibrated section. The flow and prover computer activates totalizing flow measured by flow meter when the sphere passes through detecting points at one end of the calibration section and stops totalizing when sphere reaches other ends of the calibration section. This is the totalized flow meter reading for the time required for the sphere to travel between the detecting points. This reading is then compared with the known volume of the metering pipe between the detecting points to provide an accurate calibration data and meter factor.

A four way diverter valve can be used to reverse the direction of the flow through the bi-directional prover. During proving all the fluid from the flow meter should pass through the prover. However, this should be the only fluid to pass through the prover. No fluid should leak out or creep from in between the flow meter and prover. Leaking of fluids from the four way diverter valve will result in fluid creeping out to the outlet port before passing though the prover barrel, resulting in inaccurate proving and thus inaccurate flow measurement. In the event that the diverter valve leaks immediately before or during a proving operation cycle, the meter factor obtained during proving would be inaccurate. The magnitude of the inaccuracy depends on the extent to which the diverter valve is leaking A four way diverter valve tends to leak when the sealing surfaces become excessively worn through long usage or because of the presence of abrasive materials in the fluid.

API MPMS Chap 4.2 requires that the diverter valve must be leak-free and a method of checking for seal leakage during a proving pass is required to be provided. However specific method of leakage is not specified. Some commercially available methods for checking for seal leakage, such as using a pressure gauge or differential pressure switch, provide reactive indication after failure of seal unit but do not aide in predicting current status on seal integrity in a four way diverter valve. As an example, a differential pressure switch generally provides discrete signal (such as an ON/OFF contact) for remote indication of seal failure, once the seal has failed. A differential pressure switch of some current systems do not therefore provide an indication on deteriorating condition of the seal as early warning so that an operator could take possible preventive actions.

The constant use of proving systems lead to significant wear of seals in four way diverter valves. The replacement of seal units can take a number of weeks. If such provers are used at marine terminals, as an example, ship cargo cannot be proved, which can result in monthly financial exposure in the range of millions of dollars.

SUMMARY OF THE DISCLOSURE

Systems and methods of this disclosure will monitor seal integrity and predict failure of the seals in a diverter valve, and therefore allow for the scheduling preventing maintenance before the seals fail. The present invention is particularly useful in connection with a bidirectional sphere proving system. Embodiments of this disclosure include pressure transmitters to monitor valve body cavity pressure and fluid line pressure, valve body temperature transmitters, and thermal insulation to monitor seal integrity and to predict failure. Seals can then be replaced proactively to prevent breakdown. Systems and methods of this disclosure can also monitor the function of a body cavity pressure relief valve and detect its failure.

In an embodiment of this disclosure, a method for determining the seal integrity of a four way valve is disclosed. The four way valve has a valve body with an inlet, an outlet, a first circulation port, and a second circulation port. The four way valve also has a valve plug located within the valve body with valve body seals fluidly sealing between the valve body and the valve plug, the valve plug being rotatable between a forward seated position to direct a fluid from the inlet to the first circulation port, and a reverse seated position to direct the fluid from the inlet to the second circulation port. A fluid line pressure is tracked in a fluid line that is in fluid communication with the inlet with a line pressure transmitter. A body cavity pressure is tracked in a body cavity of the four way valve with a body cavity pressure transmitter. The body cavity is a space within the valve body outside of the valve plug. A four way valve with a thermal insulation is installed that reduces the effect of an ambient temperature on the body cavity pressure. A valve body temperature is tracked with a valve body temperature transmitter.

In alternate embodiments, the fluid line pressure, the body cavity pressure, and the valve body temperature can be transmitted to a data acquisition and monitoring system. The data acquisition and monitoring system can remotely monitor, analyze and store the fluid line pressure, the body cavity pressure, and the valve body temperature.

In other alternate embodiments, a rate of increase of the body cavity pressure over time can be determined to determine an extent of failure of the valve body seals. A health of a pressure relief valve can be monitored by comparing the body cavity pressure to a set pressure of the pressure relief valve. The pressure relief valve can be associated with the body cavity for venting the body cavity fluid from the body cavity to the fluid line. The body cavity pressure when the valve plug is in the forward seated position can be compared to the body cavity pressure when the valve plug is in reverse seated position to determine a health of valve body seals. A cause of a rise in body cavity pressure can be determined by monitoring the valve body temperature over time.

In an alternate embodiment of this disclosure, a method for determining the seal integrity of the four way valve includes continuously monitoring a fluid line pressure in a fluid line that is in fluid communication with the inlet, with a line pressure transmitter that transmits the fluid line pressure to a data acquisition and monitoring system. A body cavity pressure in a body cavity of the four way valve is continuously monitored over time, with a body cavity pressure transmitter that transmits the body cavity pressure to the data acquisition and monitoring system. The body cavity is a space within the valve body outside of the valve plug. The four way valve is insulated with a thermal insulation that reduces the effect of an ambient temperature on the body cavity pressure. A valve body temperature is continuously monitoring over time with a valve body temperature transmitter that transmits the valve body temperature to a data acquisition and monitoring system.

In alternate embodiments, the fluid line pressure, the body cavity pressure, and the valve body temperature are remotely monitored, analyzed and stored with the data acquisition and monitoring system. The body cavity pressure can be analyzed over time to determine a rate of increase of the body cavity pressure over time to determine an extent of failure of the valve body seals. A health of a pressure relief valve can be monitored by comparing the body cavity pressure over time to a set pressure of the pressure relief valve. The pressure relief valve can be associated with the body cavity for venting the body cavity fluid from the body cavity to the fluid line. The body cavity pressure when the valve plug is in the forward seated position can be compared to the body cavity pressure when the valve plug is in reverse seated position to determine a health of valve body seals. The valve body temperature can be analyzed over time to determine if the valve body temperature is causing a rise in the body cavity pressure.

In yet another embodiment of the current disclosure, a system for determining the seal integrity of a four way valve is disclosed. The four way valve has a valve body with an inlet, an outlet, a first circulation port, and a second circulation port. The four way valve further includes a valve plug located within the valve body with valve body seals fluidly sealing between the valve body and the valve plug. The valve plug is rotatable between a forward seated position to direct a fluid from the inlet to the first circulation port, and a reverse seated position to direct the fluid from the inlet to the second circulation port. A line pressure transmitter is associated with a fluid line that is in fluid communication with the inlet, the line pressure transmitter tracking a fluid line pressure. A body cavity pressure transmitter is associated with a body cavity of the four way valve tracking a body cavity pressure, the body cavity being a space within the valve body outside of the valve plug. Thermal insulation insulates the four way valve and reduces the effect of an ambient temperature on the body cavity pressure. A valve body temperature transmitter is associated with the valve body and tracks a valve body temperature.

In alternate embodiments, a data acquisition and monitoring system can gather the fluid line pressure, the body cavity pressure, and the valve body temperature. The data acquisition and monitoring system can be located remotely from the four way valve and remotely monitors, displays, analyzes and stores the fluid line pressure, the body cavity pressure, and the valve body temperature. A pressure relief valve can be associated with the body cavity and can vent the body cavity fluid from the body cavity to the fluid line monitoring a health of a pressure relief valve when the body cavity pressure reaches a set pressure of the pressure relief valve.

BRIEF DESCRIPTION OF THE DRAWINGS

So that the manner in which the above-recited features, aspects and advantages of the invention, as well as others that will become apparent, are attained and can be understood in detail, a more particular description of the invention briefly summarized above may be had by reference to the embodiments thereof that are illustrated in the drawings that form a part of this specification. It is to be noted, however, that the appended drawings illustrate only preferred embodiments of the invention and are, therefore, not to be considered limiting of the invention's scope, for the invention may admit to other equally effective embodiments.

DETAILED DESCRIPTION OF THE PREFERRED EMBODIMENTS

The Specification, which includes the Summary of Disclosure, Brief Description of the Drawings and the Detailed Description of the Preferred Embodiments, and the appended Claims refer to particular features (including process or method steps) of the invention. Those of skill in the art understand that the invention includes all possible combinations and uses of particular features described in the Specification. Those of skill in the art understand that the invention is not limited to or by the description of embodiments given in the Specification. The inventive subject matter is not restricted except only in the spirit of the Specification and appended Claims.

Those of skill in the art also understand that the terminology used for describing particular embodiments does not limit the scope or breadth of the invention. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this invention belongs unless defined otherwise.

As used in the Specification and appended Claims, the singular forms "a", "an", and "the" include plural references unless the context clearly indicates otherwise. As used, the words "comprise," "has," "includes", and all other grammatical variations are each intended to have an open, non-limiting meaning that does not exclude additional elements, components or steps. Embodiments of the present invention may suitably "comprise", "consist" or "consist essentially of" the limiting features disclosed, and may be practiced in the absence of a limiting feature not disclosed. For example, it can be recognized by those skilled in the art that certain steps can be combined into a single step.

Spatial terms describe the relative position of an object or a group of objects relative to another object or group of objects. The spatial relationships apply along vertical and horizontal axes. Orientation and relational words including "uphole" and "downhole"; "above" and "below" and other like terms are for descriptive convenience and are not limiting unless otherwise indicated.

Where the Specification or the appended Claims provide a range of values, it is understood that the interval encompasses each intervening value between the upper limit and the lower limit as well as the upper limit and the lower limit. The invention encompasses and bounds smaller ranges of the interval subject to any specific exclusion provided.

Where reference is made in the Specification and appended Claims to a method comprising two or more defined steps, the defined steps can be carried out in any order or simultaneously except where the context excludes that possibility.

Figure 1:
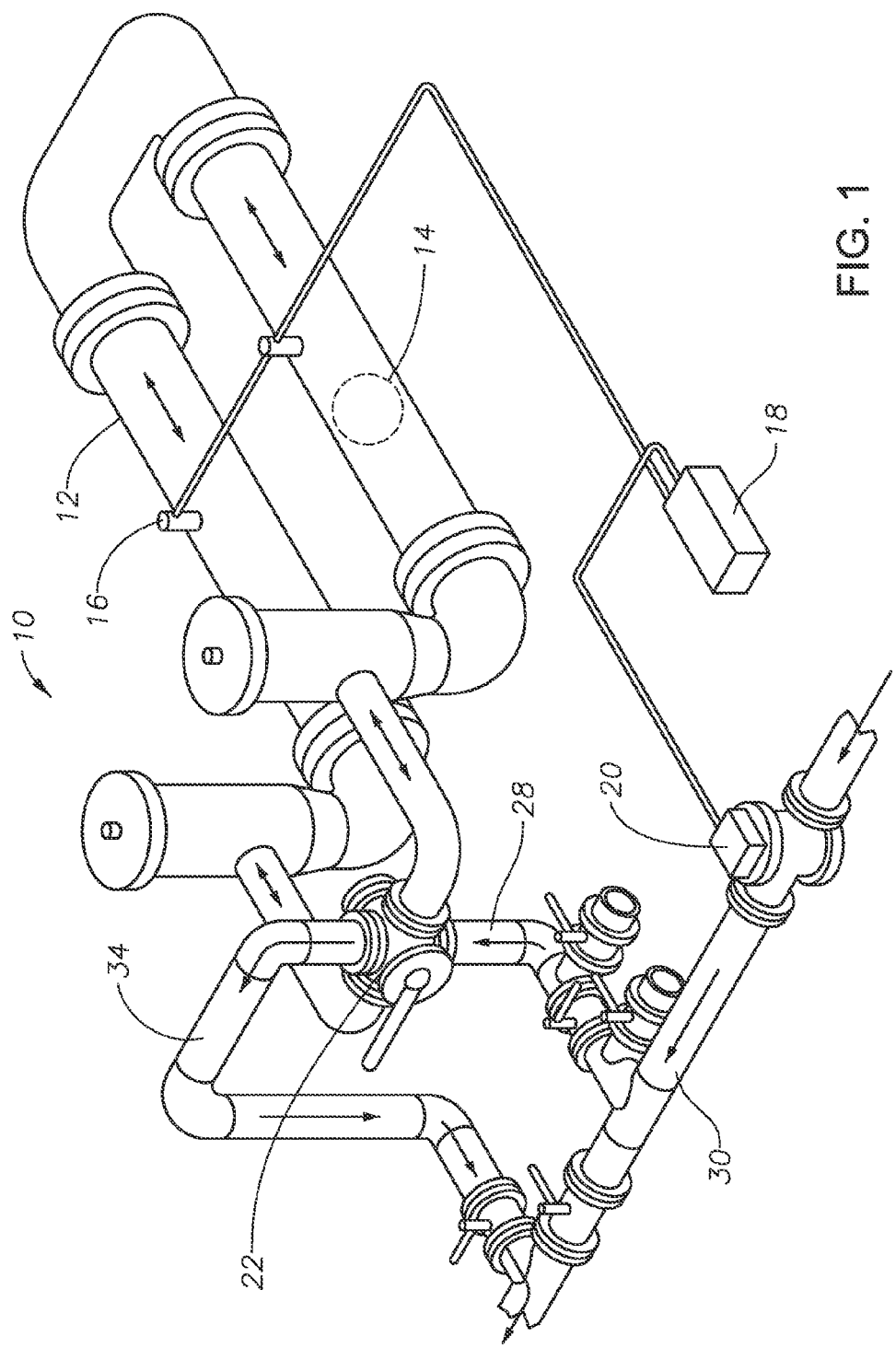
FIG. 1 is a schematic perspective view of a bidirectional prover having a four way valve with an integrity monitoring system in accordance with an embodiment of the current disclosure.

Looking at FIG. 1, prover system 10 is a bidirectional sphere prover. Prover system 10 has a calibrated length of pipe 12 through which sphere 14 travels back and forth, actuating a detector 16 at each end of calibrated length of pipe 12. As sphere 14 passes one of the detectors 16, flow and prover computer 18 activates and when sphere 14 passes through the other detector 16, prover computer 18 stops totalizing and provides volume of fluid flowing through calibrated length of pipe 12, as determined by flow meter 20 for the time required for sphere 14 to travel between detectors 16. This reading is then compared with the known volume of calibrated length of pipe 12 to provide an accurate calibration data and meter factor. This process can be undertaken in both a forward and a reverse direction. Four way diverter valve 22 can be used to change the direction of flow through calibrated length of pipe 12 between the forward and reverse direction.

Figure 2:
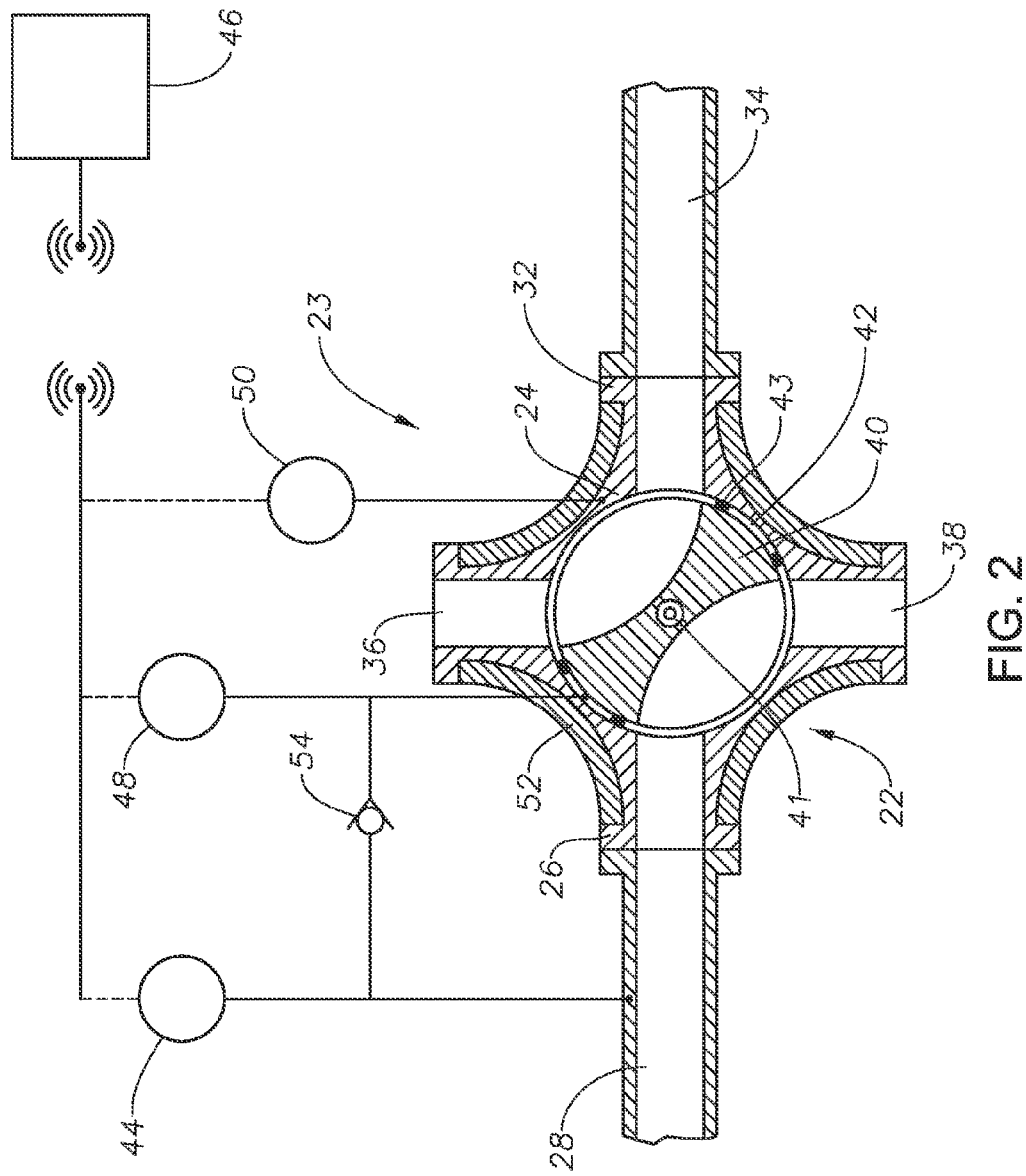
FIG. 2 is a schematic diagram of a four way valve with an integrity monitoring system in accordance with an embodiment of the current disclosure.
Figure 3:
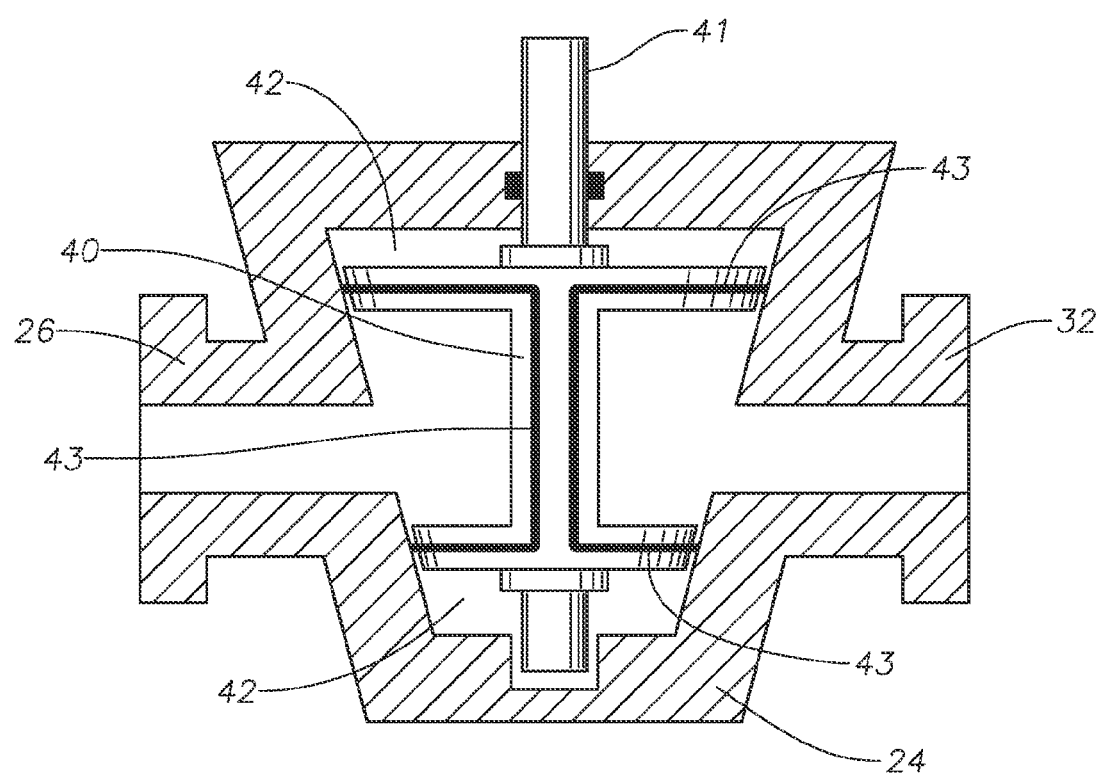
FIG. 3 is an elevation section view of the four way valve of FIG. 2, with the valve plug shown unsectioned and in an intermediate position to facilitate understanding of the valve construction.

Looking at FIGS. 2-3, diverter valve 22, of integrity monitoring system 23 includes valve body 24. Valve body 24 has inlet 26. Inlet 26 is in fluid communication with fluid line 28. Fluid line 28 directs fluid from main flow line 30 (FIG. 1) of the pipeline system that is transporting the liquid hydrocarbon into prover system 10. Valve body 24 also includes outlet 32. Outlet 32 is in fluid communication with outlet line 34. Outlet line 34 directs fluid from prover system 10 back to main flow line 30. Valve body 24 further includes first circulation port 36 and second circulation port 38. First and second circulation ports 36, 38 direct the fluid into calibrated length of pipe 12. Fluid is directed into one of the first circulation port 36 or the second circulation port 38, and exits out of the other.

Valve plug 40 is located within an inner hollow space of valve body 24. Valve plug 40 can include and upper disk and a lower disk and a web member that is generally perpendicular to the upper and lower disks and extends between the upper disk and the lower disk. Valve body seals 43 create a fluid seal between valve body 24 and the valve plug 40. Valve body seals 43 can extend radially around an outer diameter surface of the upper and lower disks. Valve body seals 43 can extend along each outer diameter side of the web member between the upper and lower disks. Body cavity 42 is defined within valve body 24 as an open space between the outside valve plug 40 and an inner surface of the hollow space of valve body 24. Body cavity 42 can be located above the upper disk and below the lower disk of valve plug 40 as well as between two valve body seals 43 that extend along each outer diameter side of the web member between the upper and lower disks of valve plug 40.

Valve plug 40 is rotatable between a forward seated position (not show) where fluid from inlet 28 is directed to first circulation port 36, and a reverse seated position (FIG. 2) where fluid from inlet 28 is directed to second circulation port 38. Vale plug 40 can be rotated, as an example, with a shaft 41. When valve plug 40 is in either of the forward seated or reverse seated positions, valve body seals 43 prevent fluids that are traveling from port 26 from reaching to port 32 through body cavity 42 without flowing through calibrated length of pipe 12. When valve plug 40 is in an unseated position, such as when valve plug 40 is rotated between the forward seated and reverse seated positions, fluids in diverter valve 22 can freely reach body cavity 42.

Looking at FIG. 2, integrity monitoring system 23 includes line pressure transmitter 44. Line pressure transmitter 44 tracks a fluid line pressure in fluid line 28. Fluid line pressure is a measure of the pressure of the fluid in fluid line 28. Line pressure transmitter 44 can transmit the fluid line pressure to data acquisition and monitoring system 46. Data acquisition and monitoring system 46 can be located remotely from prover system 10 and can process, display, analyze and store the fluid line pressure data. Line pressure transmitter 44 can track and transmit the fluid line pressure to data acquisition and monitoring system 46 by way of a cable or by a known method of wireless transmission. Line pressure transmitter 44 can collect and transmit the fluid line pressure over time and provide a constant streaming real time fluid line pressure to data acquisition and monitoring system 46. In alternate embodiments, fluid line pressure can be transmitted to data acquisition and monitoring system 46 at predetermined intervals or on demand.

Integrity monitoring system 23 further includes body cavity pressure transmitter 48 that tracks a body cavity pressure in body cavity 42 of diverter valve 22. Body cavity pressure transmitter 48 is measuring the pressure of the body cavity fluid, which is fluid that is trapped in body cavity 42. Body cavity pressure transmitter 48 can transmit the body cavity pressure to data acquisition and monitoring system 46. Body cavity pressure transmitter 48 can track and transmit the body cavity pressure to data acquisition and monitoring system 46 by way of a cable or by a known method of wireless transmission. Body cavity pressure transmitter 48 can collect and transmit the body cavity pressure over time and provide a constant streaming real time body cavity pressure to data acquisition and monitoring system 46. In alternate embodiments, body cavity pressure can be transmitted to data acquisition and monitoring system 46 at predetermined intervals or on demand.

Integrity monitoring system 23 further includes valve body temperature transmitter 50 that tracks a valve body temperature. Valve body temperature can be measured as either or both of the valve body 24 or of a body cavity fluid within body cavity 42 of diverter valve 22. Valve body temperature transmitter 50 can transmit the valve body temperature to data acquisition and monitoring system 46. Valve body temperature transmitter 50 can track and transmit the valve body temperature to data acquisition and monitoring system 46 by way of a cable or by a known method of wireless transmission. Valve body temperature transmitter 50 can collect and transmit the valve body temperature over time and provide a constant streaming real time valve body temperature to data acquisition and monitoring system 46. In alternate embodiments, valve body temperature can be transmitted to data acquisition and monitoring system 46 at predetermined intervals or on demand. Pressure and temperature measurement transmitted to acquisition and monitoring system 46 can be archived and retrieved as required to analyze historical performance of diverter valve 22.

Integrity monitoring system 23 also includes thermal insulation 52. Thermal insulation 52 insulates the diverter valve 22 with a thermal insulation that reduces the effect of an ambient temperature on the body cavity pressure. Temperature stability of diverter valve 22 can be maintained for the period of time required to perform the proving procedure by the thermal insulation. In the example embodiment of FIG. 2, only diverter valve 22 is shown as having thermal insulation 52. In alternate embodiments, the pipelines that are fluidly connected to diverter valve 22, such as fluid line 28 and outlet line 34, can also be covered by thermal insulation 52.

Pressure relief valve 54 is associated with, and fluidly connected between body cavity 42 and fluid line 28 and can vent body cavity fluid from body cavity 42 to fluid line 28 if the pressure of the body cavity fluid exceeds a set pressure of pressure relief valve 54 or if the pressure differential between the body cavity pressure and the fluid line pressure exceeds a set amount. The increase in body cavity pressure can be caused, for example, by thermal expansion or by leakage of fluids through valve body seals 43.

In an example of operation, looking at FIG. 1, when prover system 10 is used to determine the data and meter factor, fluid within main flow line 30 will be directed into diverter valve 22. Valve plug 40 is rotated to either the forward seated position or the reverse seated position. While moving between the forward seated position and the reverse seated position, the fluid line pressure will be generally similar to the body cavity pressure. When valve plug 40 is seated in either the forward seated position or the reverse seated position, the body cavity pressure will drop. The fluid line pressure is not affected by the operation of diverter valve 22, therefore when valve plug 40 is seated in either the forward seated position or the reverse seated position, the body cavity pressure is expected to be lower than the fluid line pressure. If the integrity of valve body seals 43 is maintained and valve body seals 43 do not allow fluid from the higher pressure fluid line 28 to leak into body cavity 42, this lower pressure in body cavity 42 shall be maintained.

Figure 4:
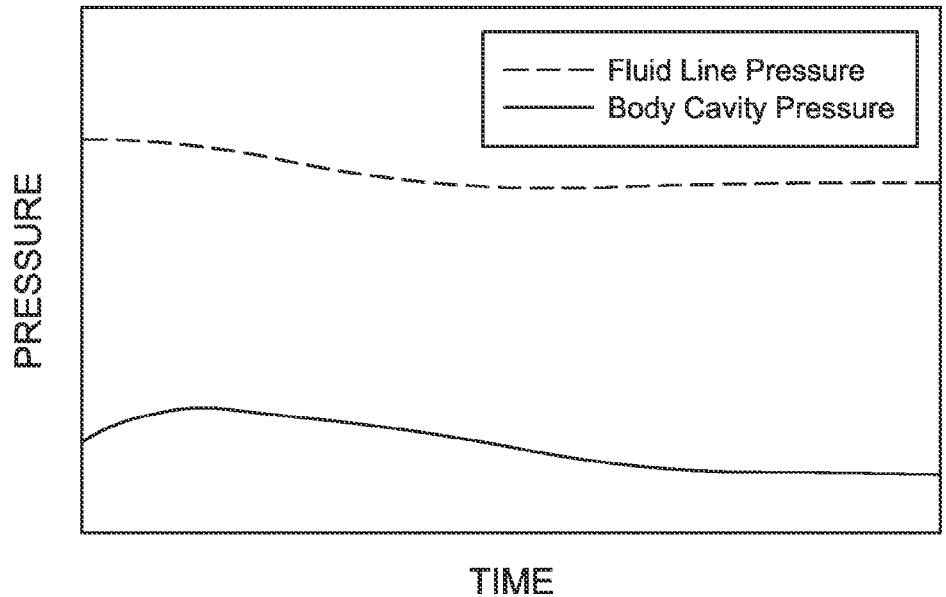
FIG. 4 is a chart showing body cavity pressure maintained at a lower rate than fluid line pressure, over a time period, as monitored by an integrity monitoring system in accordance with an embodiment of the current disclosure.

Looking at FIGS. 2 and 4, as line pressure transmitter 44 and body cavity pressure transmitter 48 track fluid line pressure and body cavity pressure, respectively, they can monitor fluid line pressure and body cavity pressure continuously and transmit the fluid line pressure and body cavity pressure to data acquisition and monitoring system 46. The results of such monitoring can be shown graphically to visualize the changes in fluid line pressure and body cavity pressure over time. As can be seen in the example of FIG. 4, body cavity pressure remains lower than fluid line pressure and body cavity pressure does not creep upwards over time. This indicates that valve body seals 43 are intact and properly functioning and do not allow fluid from the higher pressure fluid line 28 to leak into body cavity 42.

Figure 5:
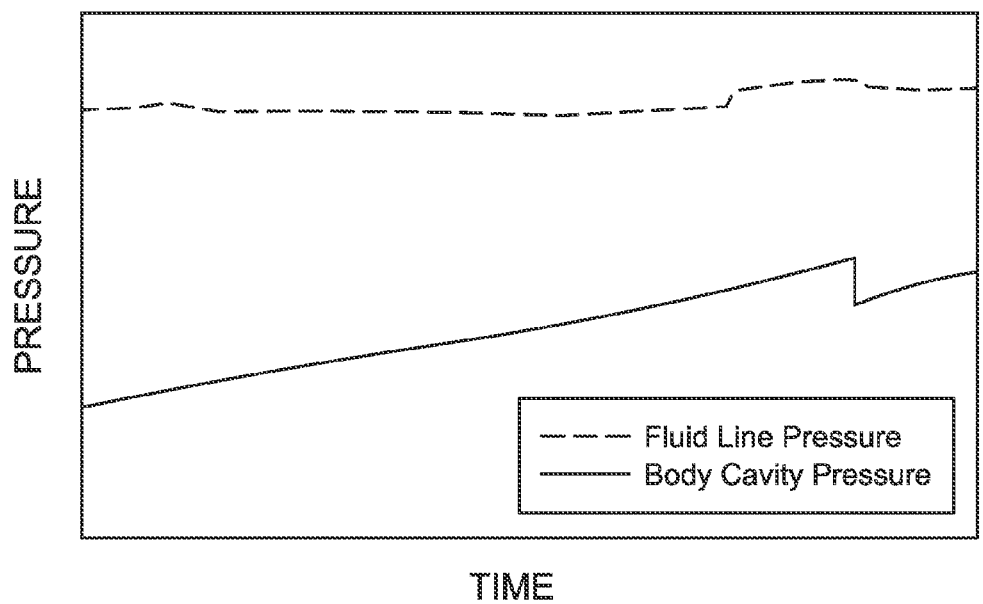
FIG. 5 is a chart showing body cavity pressure rising relative to fluid line pressure, over a time period, as monitored by an integrity monitoring system in accordance with an embodiment of the current disclosure.

Looking at 4, line pressure transmitter 44 and body cavity pressure transmitter 48 are again continuously transmitting the fluid line pressure and body cavity pressure, respectively, to data acquisition and monitoring system 46. In the example of FIG. 5, however, body cavity pressure is creeping upwards over time. This could indicate that valve body seals 43 are compromised and are allowing fluid from the higher pressure fluid line 28 to leak into body cavity 42.

In addition to considering the magnitude of the increase in body cavity pressure over time, a rate of increase of the body cavity pressure over time can be evaluated to determine an extent of failure of the valve body seals 43. The condition of valve body seals 43 generally deteriorate over a period of time before valve body seals 43 fail completely. At the onset of the deterioration of valve body seals 43, fluid from the fluid line 28 which is at a higher pressure than the fluid in body cavity 42, will minimally creep into body cavity 42. At this stage, body cavity pressure will take a longer period of time to reach fluid line pressure. Also, because on a relatively short period of time is required to complete the proving procedure, body cavity pressure may not rise high enough to warrant aborting the proving procedure. As the condition of valve body seals 43 worsens, body cavity pressure will equalize with fluid line pressure faster, and over a shorter period of time. Therefore, the rate of increase in body cavity pressure, at a stable temperature, will indicate an extent of failure of valve body seals 43. The determination of the rate of increase in body cavity pressure can therefore provide an early warning sign of the deterioration of valve body seals 43 and can help in the scheduling of predictive maintenance.

As will be understood by those with skill in the art, however, the rate of increase in body cavity pressure alone may not be indicative of failure of valve body seals 43. Changes in valve body temperature can also affect body cavity pressure. It is a known and established phenomenon that the volume of liquids, including hydrocarbons, increases with increase in temperature. If the temperature of a liquid in a confined space increases, it will lead to an increase in pressure of such liquid. This phenomenon is applicable diverter valve 22 in that when valve body seals 43 are intact and healthy body cavity 42 is a confined space. If the valve body temperature increases due, for example, to an increase in ambient temperature, the temperature of body cavity fluid can in turn increase, resulting in an increase in body cavity pressure. This increase in body cavity pressure could be wrongly concluded as being caused by leaking valve body seals 43. Therefore without monitoring valve body temperature over time, it is unknown if the increase in body cavity temperature as seen in FIG. 2 is caused by leaking valve body seals 43 or caused by an increase in valve body temperature.

Looking at FIG. 2, thermal insulation 52 helps to mitigate the effect of changes in ambient temperature on the valve body temperature. Temperature transmitter 50 monitors the valve body temperature over time and transmits such information to acquisition and monitoring system 46 so that the body cavity pressure can be analyzed over a period of time together with corresponding valve body temperature over the same period of time. In this way, it can be determined if the valve body temperature is causing or contributing to a rise in the body cavity pressure.

As discussed, when the valve body seals 43 are intact, an increase in ambient temperature can lead to an increase in the body cavity pressure. If this increase in ambient temperature causes body cavity pressure to reach a set pressure of pressure relief valve 54, the increased pressure will be relieved to fluid line 28 through pressure relief valve 54. The increase in body cavity pressure and subsequent release of body cavity pressure can be monitored using body cavity pressure transmitter 48. By monitoring this cycle, the set pressure of pressure relief valve 54 can be checked and the health and functionality of pressure relief valve 54 can be confirmed. As an example, by comparing the body cavity pressure over time to the set pressure of pressure relief valve 54, an operator can determine if pressure relief valve 54 has vented body cavity pressure as appropriate to determine a health of pressure relief valve 54. In the event that pressure relief valve 54 does not function and relieve the pressure at the set point, an alarm can be raised so an operator can take corrective action to avoid a high pressure related incident.

Figure 6:
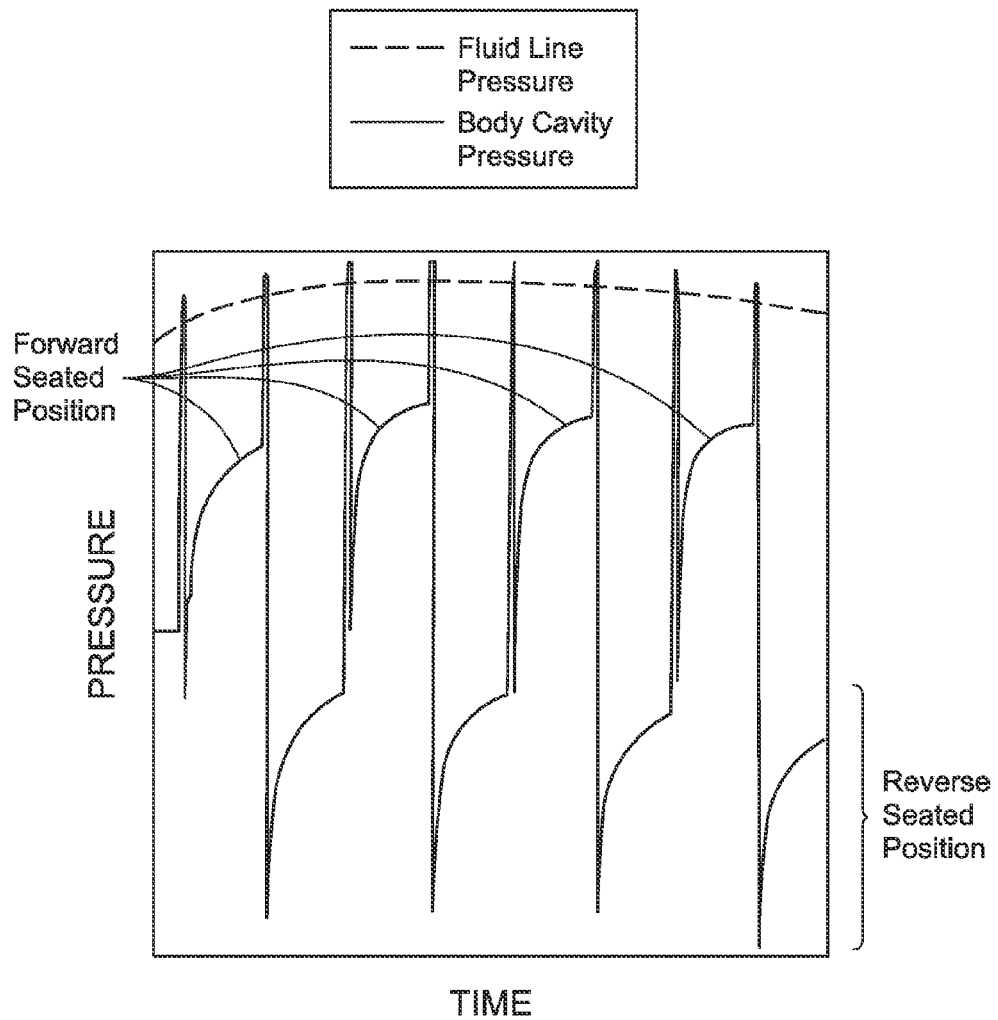
FIG. 6 is a chart comparing body cavity pressure in the forward seated position to the body cavity pressure in the reverse seated position, as monitored by an integrity monitoring system in accordance with an embodiment of the current disclosure.

Turning to FIGS. 2 and 6, another method of measuring the integrity of valve body seals 43 is to compare body cavity pressure when valve plug 40 is seated in the forward seated position to the body cavity pressure when valve plug 40 is seated in the reverse seated position. Ideally, the body cavity pressure should be same forward seated position and the reverse seated position. However, owing to construction tolerances, minor differences in body cavity pressure between the forward seated position and the reverse seated position are not unexpected. However, in the example of FIG. 6, the significant difference between the body cavity pressure when valve plug 40 is seated in the forward seated position to the body cavity pressure when valve plug 40 is seated in the reverse seated position can indicate a problem with valve body seals 43 when valve plug 40 is in the forward seated position and that the health of valve body seals 43 should be further evaluated. Such a difference in cavity pressure when valve plug 40 is seated in the reverse seated position can indicate, for example, a difference in application of torque in diverter valve 22, or another unhealthy condition.

A failure of diverter valve 22 leads to prover system 10 downtime and most common reason for prover down time for some current prover systems is attributed to a breakdown of diverter valve 22. Embodiments of this disclosure can predict valve body seal 43 failure and can help to schedule predictive maintenance to reduce unforeseen prover break downs.

Embodiments described herein, therefore, are well adapted to carry out the objects and attain the ends and advantages mentioned, as well as others inherent therein. While a presently preferred embodiment has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A method for determining the seal integrity of a four way valve, the four way valve having a valve body with an inlet, an outlet, a first circulation port, and a second circulation port, the four way valve further having a valve plug located within the valve body with valve body seals fluidly sealing between the valve body and the valve plug, the valve plug being rotatable between a forward seated position to direct a fluid from the inlet to the first circulation port, and a reverse seated position to direct the fluid from the inlet to the second circulation port, the method comprising:
    tracking a fluid line pressure in a fluid line that is in fluid communication with the inlet, with a line pressure transmitter;
    tracking a body cavity pressure in a body cavity of the four way valve, with a body cavity pressure transmitter, the body cavity being a space within the valve body outside of the valve plug;
    insulating the four way valve with a thermal insulation that reduces the effect of an ambient temperature on the body cavity pressure; and
    tracking a valve body temperature with a valve body temperature transmitter.

2. A method in accordance with claim 1, further comprising transmitting the fluid line pressure, the body cavity pressure, and the valve body temperature to a data acquisition and monitoring system.

3. A method in accordance with claim 2, further comprising remotely monitoring, analyzing and storing the fluid line pressure, the body cavity pressure, and the valve body temperature with the data acquisition and monitoring system.

4. A method in accordance with claim 1, further comprising determining a rate of increase of the body cavity pressure over time to determine an extent of failure of the valve body seals.

5. A method in accordance with claim 1, further comprising monitoring a health of a pressure relief valve by comparing the body cavity pressure to a set pressure of the pressure relief valve, the pressure relief valve being associated with the body cavity for venting the body cavity fluid from the body cavity to the fluid line.

6. A method in accordance with claim 1, further comprising comparing the body cavity pressure when the valve plug is in the forward seated position to the body cavity pressure when the valve plug is in reverse seated position to determine a health of valve body seals.

7. A method in accordance with claim 1, further comprising determining a cause of a rise in body cavity pressure by monitoring the valve body temperature over time.

8. A method for determining the seal integrity of a four way valve, the four way valve having a valve body with an inlet, an outlet, a first circulation port, and a second circulation port, the four way valve further having a valve plug located within the valve body with valve body seals fluidly sealing between the valve body and the valve plug, the valve plug being rotatable between a forward seated position to direct a fluid from the inlet to the first circulation port, and a reverse seated position to direct the fluid from the inlet to the second circulation port, the method comprising:
    continuously monitoring a fluid line pressure in a fluid line that is in fluid communication with the inlet, with a line pressure transmitter that transmits the fluid line pressure to a data acquisition and monitoring system;
    continuously monitoring a body cavity pressure in a body cavity of the four way valve over time, with a body cavity pressure transmitter that transmits the body cavity pressure to the data acquisition and monitoring system, the body cavity being a space within the valve body outside of the valve plug;
    insulating the four way valve with a thermal insulation that reduces the effect of an ambient temperature on the body cavity pressure; and
    continuously monitoring a valve body temperature over time with a valve body temperature transmitter that transmits the valve body temperature to a data acquisition and monitoring system.

9. A method in accordance with claim 8, further comprising analyzing the body cavity pressure over time to determining a rate of increase of the body cavity pressure over time to determine an extent of failure of the valve body seals.

10. A method in accordance with claim 8, further comprising monitoring a health of a pressure relief valve by comparing the body cavity pressure over time to a set pressure of the pressure relief valve, the pressure relief valve being associated with the body cavity for venting the body cavity fluid from the body cavity to the fluid line.

11. A method in accordance with claim 8, further comprising comparing the body cavity pressure when the valve plug is in the forward seated position to the body cavity pressure when the valve plug is in reverse seated position to determine a health of valve body seals.

12. A method in accordance with claim 8, further comprising determining if the valve body temperature is causing a rise in the body cavity pressure by analyzing the valve body temperature over time.

13. A system for determining the seal integrity of a four way valve, the four way valve having a valve body with an inlet, an outlet, a first circulation port, and a second circulation port, the four way valve further having a valve plug located within the valve body with valve body seals fluidly sealing between the valve body and the valve plug, the valve plug being rotatable between a forward seated position to direct a fluid from the inlet to the first circulation port, and a reverse seated position to direct the fluid from the inlet to the second circulation port, the system comprising:
- a line pressure transmitter associated with a fluid line that is in fluid communication with the inlet, the line pressure transmitter tracking a fluid line pressure;
- a body cavity pressure transmitter associated with a body cavity of the four way valve tracking a body cavity pressure, the body cavity being a space within the valve body outside of the valve plug;
- thermal insulation insulating the four way valve and reducing the effect of an ambient temperature on the body cavity pressure; and
- a valve body temperature transmitter associated with the valve body and tracking a valve body temperature.

14. A system in accordance with claim 13, further comprising a data acquisition and monitoring system gathering the fluid line pressure, the body cavity pressure, and the valve body temperature.

15. A system in accordance with claim 13, wherein the data acquisition and monitoring system is a located remotely from the four way valve and remotely monitors, displays, analyzes and stores the fluid line pressure, the body cavity pressure, and the valve body temperature.

16. A system in accordance with claim 1, further comprising a pressure relief valve associated with the body cavity and venting the body cavity fluid from the body cavity to the fluid line monitoring a health of a pressure relief valve when the body cavity pressure reaches a set pressure of the pressure relief valve.

17. A method in accordance with claim 8, further comprising remotely monitoring, analyzing and storing the fluid line pressure, the body cavity pressure, and the valve body temperature with the data acquisition and monitoring system.

* * * * *